Dec. 12, 1961 M. J. ZUCROW ET AL 3,012,866
PROPELLANT FOR ROCKET MOTORS
Filed Dec. 22, 1945 2 Sheets-Sheet 1

INVENTORS
MAURICE J. ZUCROW
ROBERT L. HIRSCH
CHARLES B. LARGE
BY Christie & Angus
ATTORNEYS INVENTORS
MAURICE J. ZUCROW
ROBERT L. HIRSCH
CHARLES B. LARGE
BY
Christie & Angus
ATTORNEYS

3,012,866
PROPELLANT FOR ROCKET MOTORS
Maurice J. Zucrow, Altadena, Robert L. Hirsch, Glendale, and Charles B. Large, Pasadena, Calif., assignors, by mesne assignments, to Aerojet-General Corporation, Cincinnati, Ohio, a corporation of Ohio
Filed Dec. 22, 1945, Ser. No. 637,004
3 Claims. (Cl. 52—.5)

This invention is concerned with jet propulsion and provides improved solid propellant charges capable of good performance after or during exposure over a wide range of weather and temperature conditions.

In the operation of certain types of rocket motors, it is customary to burn a solid charge in a motor chamber to produce a large volume of gas, thereby creating a high velocity gas jet through an exhaust nozzle leading from the chamber, with resultant high thrust.

Solid charges for rocket motors are exposed to a wide variety of weather conditions and a wide range of temperatures between the time of their manufacture and the time of use. Thus, rocket motors containing solid charges may be stored for long periods in the tropics or in frigid regions, and in use on aircraft at high altitudes may encounter even lower temperatures.

Many heretofore customary types of solid charges tend to flow under tropical conditions or to become brittle and cracked at low temperatures, say sub-zero temperatures. Thus, solid charges comprising a mixture of solid oxidizers with a thermoplastic fuel, such for example as asphalt, may flow in the motor chamber during storage to produce voids and irregular surfaces, or at low temperatures may crack. The formation of voids or cracks increases the area for burning. This may accelerate combustion, raise the pressure in the motor chamber, and produce explosions instead of the desired high but relatively uniform thrust exerted over a substantial time interval.

As a result of our investigations, we have developed an improved type of solid propellant charge which has excellent characteristics for use in jet propulsion. Charges of our invention have burning qualities which permit the development of high thrust over a substantial time interval. At the same time, the charges are such that they do not become unduly brittle at low temperatures, with resultant cracking, and are adequately resistant to flow in tropical environments. The solid propellant charge of our invention comprises an intimate mixture of a fuel in the form of a synthetic elastomer with a finely divided inorganic oxidizer, preferably incorporated therein by dry milling. I prefer to employ as an elastomer a synthetic organic rubber-like polymerized material of the type having linear polymers and containing little or no oxygen in its molecule. Such polymers should be and generally are thermoplastic or thermosetting.

Examples of suitable synthetic elastomers for use in the practice of the invention are polyisobutylene, butyl rubber, butadiene-styrene copolymers such as Buna-S, a polyalkylene sulfide such as Thiokol, a butadiene-acrylonitrile copolymer, for example, Buna-N, highly polymerized vinyl alcohols in a plasticized state such as polyvinyl alcohol and chloroprene polymers such as neoprene. Generally speaking, the chlorine content of the elastomer should be low, it having been found that those synthetic elastomers containing chlorine in excess of that present in neoprene (say 40% by weight) are generally unsatisfactory as rocket fuels.

Any stable finely divided inorganic oxidizer which can be incorporated safely into the elastomer by dry milling, i.e. milling in the presence of little or no vaporizable solvent, may be used. Thus, chromates, permanganates, nitrates, chlorates and perchlorates may be suitable (depending upon milling conditions and burning properties desired), preferred examples being perchlorates, especially ammonium perchlorate and potassium perchlorate.

From the foregoing, it will be apparent that the invention contemplates the combination in a rocket which comprises a combustion chamber, a lining of synthetic elastomer in the chamber, and a solid charge composed of a synthetic elastomer intimately mixed, and preferably dry milled, with a solid finely divided oxidizing agent with the charge snugly disposed within the liner and preferably affixed thereto.

The dry milling appers to result in a charge having a more uniform burning rate. It may be accomplished in various types of apparatus, such as differential rolls or other equipment in which the milling occurs between revolving surfaces moving in opposite directions in the milling zone, but at different speeds. The proportions thus milled together should be such that the resulting mixture remains plastic. In general from 70% to 90% by weight of the stable finely divided inorganic oxidizer such as alkali metal or ammonium perchlorates may be incorporated while maintaining required plasticity.

The mixture, preferably dry-milled, of finely divided inorganic oxidizer and synthetic elastomer may be formed into a propellant charge in various ways. We prefer to form the mixture into sheets after which the sheets are superposed and compressed together with forces exerted transverse to the faces of the sheets. In a preferred practice the sheets are compressed together in a plastic case, preferably a case of synthetic elastomer, the compression being such that the resulting solid mass is squeezed and affixed to the casing.

Polymerized isobutylene, a thermoplastic elastomer, is an especially favorable substance for use as the fuel, and it may conveniently be admixed with a perchlorate. Polymerized isobutylene is obtainable under the trade name of "Vistanex" and is produced in several grades which represent various degrees of polymerization. A preferred form of polyisobutylene is the so-called "100 grade Vistanex" which is polyisobutylene having an average molecular weight of 100,000. This thermoplastic linear elastomer is particularly suited for compounding solid propellant charges that are to be subjected to low temperatures because of its elasticity at zero or subzero temperatures. The propellant is made from it by adding to it, for example by milling in the manner described above, a stable solid inorganic oxidizing agent such as the inorganic perchlorate.

The selection of the inorganic perchlorate will ordinarily depend on the particular burning properties desired. Examples of stable inorganic perchlorates which may be employed with this fuel are those of most metals, alkali metal perchlorates and ammonium perchlorate being preferred. The proportions may be used in compounding propellants, range between 70% and 90% by weight of the inorganic oxidizer and between 30% and 10% by weight of polyisobutylene.

We have found that an excellent proportion, where the preferred "100 grade Vistanex" having an average molecular weight of 100,000 is used, is 76% by weight potassium perchlorate and 24% by weight polyisobutylene.

Butyl rubber, another good substance for use as the fuel, is a thermosetting elastomer. It is generally composed of copolymer of isobutylene and isoprene. This plastic material may be purchased in various grades whose designation indicates the varying amounts of isoprene that have been added to the isobutylene in making the copolymer. The butyl rubber usually employed contains between 1% and 5% by weight of isoprene. A preferred grade of butyl rubber is one in which the copolymer is made from about 1½% by weight isoprene and about 98.5% by weight isobutylene. This linear elastomer is particularly effective when vulcanized by the action of sulphur and/or other vulcanizing agents and heat. The amount of sulphur employed can vary from about 2% to 5% by weight of the butyl rubber. Vulcanizing makes butyl rubber thermosetting.

Propellants may be made from the butyl rubber by adding a solid inorganic oxidizing agent to the unvulcanized butyl rubber, as in the case of polyisobutylene, in amounts varying between 70% and 90% by weight of the inorganic oxidizer and between 30% and 10% by weight of the butyl rubber.

A preferred propellant composition is prepared by mixing 76% by weight of potassium perchlorate with 24% by weight of butyl rubber, preferably of the type having about 1½% by weight of isoprene.

The manner in which these propellant charges may be prepared and the manner in which it is employed in a jet motor will be more clearly understood with reference to the accompanying description and drawings of which:

Figure 1:
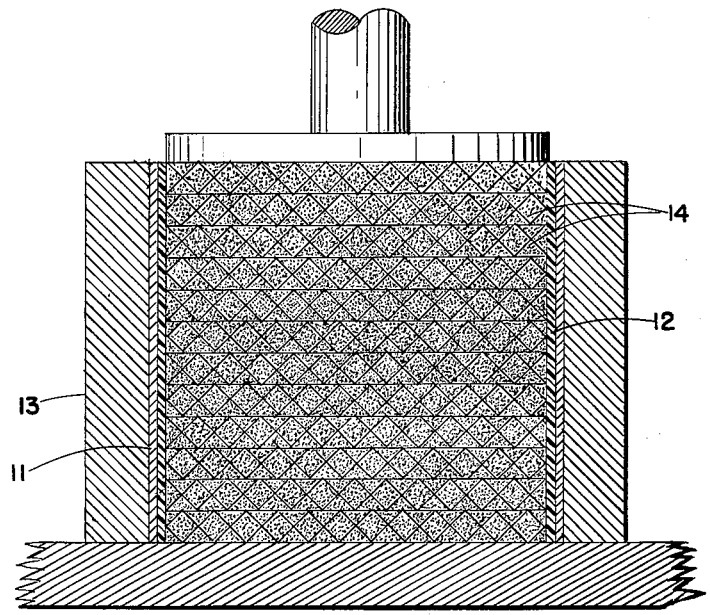
FIG. 1 shows a manner in which the charge is composited.

The propellant material is prepared by milling preferably in a differential roll mill, finely divided particles of the desired inorganic oxidizer, such as $KClO_4$, $NH_4ClO_4$, or other stable inorganic perchlorate, into the polyisobutylene, or butyl rubber, or whichever other elastomer may be selected as the fuel, until the oxidizer is homogeneously dispersed throughout the mass. The resulting material can then be formed into sheets of uniform thickness, and discs of the required diameter may be cut from these sheets. The discs should be fitted inside a charge container, and the size of the propellant discs will be determined by the size of the container.

A suitable container for the purpose is a container 11, which may be made of sheet metal or some other fireproof lightweight material and placed inside a press mold 13. It has been found desirable to line the container with a liner 12 having similar temperature expansion properties to those of the organic rubber-like plastic materials used in compounding the propellant charge. This liner tends to provide a good bond between the propellant charge and the container and preferably should be slower in burning rate than the propellant. An advantage of such a liner 12 is that it prevents the propellant charge from burning down the sides between the surface of the charge and the container wall.

The lined container may be placed in a heated pressing mold 13 and discs 14 cut from the propellant sheets are placed inside the lined container until the entire cylindrical space is filled. The container, liner and propellant discs should then be heated to an elevated temperature, preferably between 180° F. and 250° F. The heated discs and liner should then be subjected to pressures subjected to pressures ranging between 100 and 10,000 p.s.i. In this manner the discs and liner are pressed into a solid charge which is relatively free from cavities, air bubbles or imperfections.

A preferred form of liner may be made by milling into polyisobutylene about 15% by weight of carbon black and then rolling the resulting mass into a sheet of uniform thickness. The liner thus formed can be placed inside the container and should preferably cover all the walls.

Adhesive properties of the above liner may be improved by washing the sheet of liner material with a petroleum solvent before it is placed in the container, as this wash materially increases the tackiness of the liner.

When the butyl rubber is used as the fuel in the propellant, sulphur should be added to the butyl rubber and the mixture made homogeneous by milling in the differential roll mill. The inorganic oxidizer is then milled into the butyl rubber sulfur mixture until it is uniformly distributed. Sheets can then be rolled in the same manner as those made of polyisobutylene and then cut into discs of appropriate size. The discs are placed in a fireproof container which has been lined with a sheet of butyl rubber and the liner and discs are subjected to heat and pressure. During the period in which the propellant charge in the container is heated under pressure the butyl rubber becomes vulcanized. This produces a propellant which is not materially softened by elevated temperatures and which possesses suitable elastic properties at zero or subzero temperatures.

Figure 2:
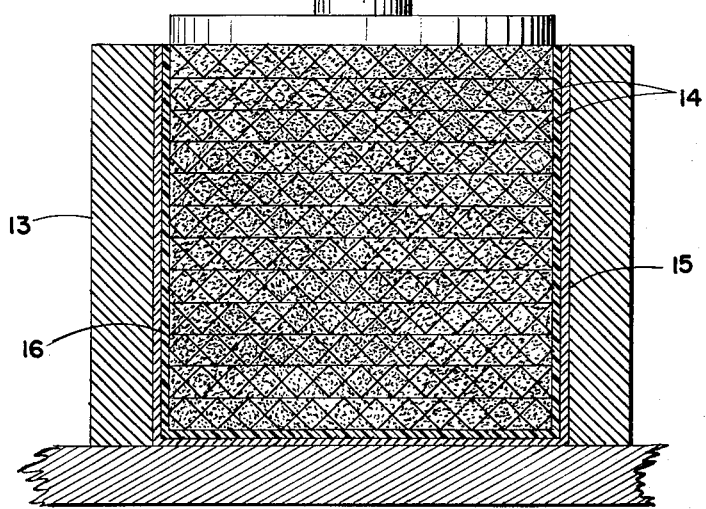
FIG. 2 shows an alternative method for making up the charge.

An alternative manner in which the propellant charge may be composited is shown in FIG. 2. A suitable cylindrical container 15, closed at one end and made of sheet metal, or other rigid fireproofed material, is lined inside with polyisobutylene. This liner 16 may be deposited on the walls from a solution of polyisobutylene in naphtha and may be built up to any desired thickness. The solution of polyisobutylene ranges between 20% and 40% by weight of polyisobutylene and 80% and 60% by weight of volatile petroleum naphtha.

When a liner of the desired thickness has been deposited in the container, propellant discs 14 made in the same manner as described above are placed in the lined container 16. The lined container and the propellant discs are then placed in a mold 13 and heated. The entire mass of propellant and the liner is subjected to heat and pressure in the same manner as described above.

A propellant charge may also be prepared in the following manner: The inorganic oxidizer is milled into the organic rubber-like plastic material until the mixture is homogeneous and all air has been expelled. The milled material is then placed into an extruder having an orifice of the desired diameter, through which the milled material is forced under pressure.

Figure 3:
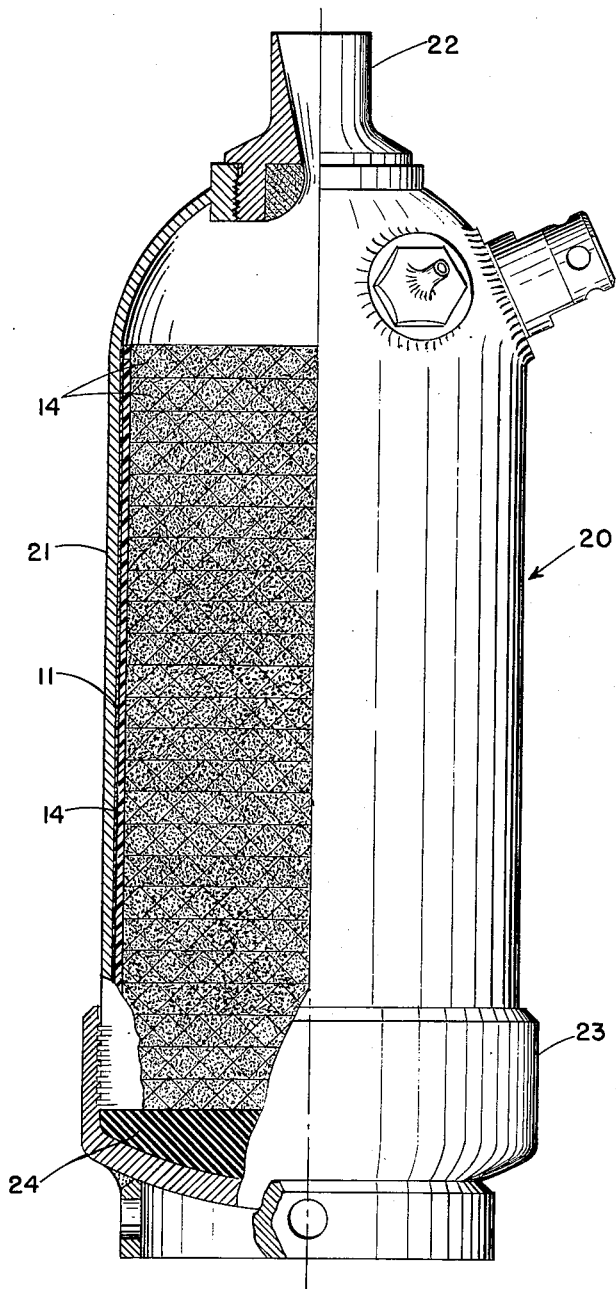
FIG. 3 is a view partly in cross section showing a propellant charge installed in a motor.

The manner in which these propellant charges may be employed in a jet motor is better illustrated in FIG. 3. This view shows a rocket motor 20 comprising a cylindrical chamber section 21 terminating at one end in an exhaust nozzle 22. The opposite end of the cylindrical chamber is closed by a head member 23 threaded to the chamber 21. A propellant charge, surrounded by a fireproof container 11, and compounded in the manner described above is inserted into the cylindrical chamber 21. A disc of resilient material 24 is placed in head piece 23 and assists in keeping the propellant from moving in a longitudinal direction when the head member 23 is screwed in position.

By means of this invention it is possible to provide a substantially homogeneous propellant charge that is relatively free of cavities, liner imperfections and air bubbles. Propellant charges compounded from the materials described above possess excellent low temperature properties when cooled to zero or subzero temperatures. The propellant material does not become brittle as is often the case where asphalt is used as the binder, and, therefore, freedom from cracking in the finished product due to chilling is insured.

Another advantage obtained by employing these types of material for compositing the charges is that it is not necessary to subject the ingredients to prolonged heating at elevated temperatures in order to insure a homogeneous product.

We claim:

1. A propellant charge comprising an intimate mixture of 70% to 90% by weight of a stable inorganic perchlorate and 30% to 10% by weight of a copolymer of isobutylene and isoprene wherein the isoprene is present in the amount of 1% to 5% by weight of the copolymer.

2. A propellant charge comprising an intimate mixture consisting substantially of 76 parts potassium perchlorate by weight, 24 parts of a copolymer of isobutylene and isoprene wherein the isoprene is present in the amount of 1% to 5% by weight of the copolymer, and from about 2% to about 5% sulfur by weight.

3. A propellant charge comprising an intimate mixture of 70% to 90% by weight of an inorganic oxidizer from the group consisting of chromates, permanganates, nitrates, chlorates and perchlorates, and 30% to 10% by weight of a copolymer of isobutylene and isoprene wherein the isoprene is present in the amount of 1% to 5% by weight of the copolymer.

References Cited in the file of this patent

UNITED STATES PATENTS

| | | |
|---|---|---|
| 393,634 | Farrier | Nov. 27, 1888 |
| 778,788 | Maxim | Dec. 27, 1904 |
| 933,060 | Clement et al. | Sept. 7, 1909 |
| 2,004,436 | Jaeger | June 11, 1935 |
| 2,043,268 | Skinner | June 9, 1936 |
| 2,067,213 | Snelling | Jan. 12, 1937 |
| 2,159,234 | Taylor | May 23, 1939 |
| 2,170,191 | Fisher | Aug. 22, 1939 |
| 2,195,380 | Patrick | Mar. 26, 1940 |
| 2,393,321 | Haworth | Jan. 22, 1946 |
| 2,402,977 | Patrick | July 2, 1946 |
| 2,410,801 | Audrieth | Nov. 12, 1946 |
| 2,416,639 | Pearsall | Feb. 25, 1947 |
| 2,434,872 | Taylor | Jan. 20, 1948 |
| 2,451,865 | O'Brien | Oct. 19, 1948 |

FOREIGN PATENTS

| | | |
|---|---|---|
| 1,703 | Great Britain | of 1855 |
| 1,062 | Great Britain | of 1863 |
| 1,969 | Great Britain | of 1882 |
| 8,470 | Great Britain | of 1898 |
| 502,560 | France | Feb. 24, 1920 |

OTHER REFERENCES

"Aircraft Engineering," issue of September 1935, article by Ley, page 228.